Patented Feb. 14, 1939

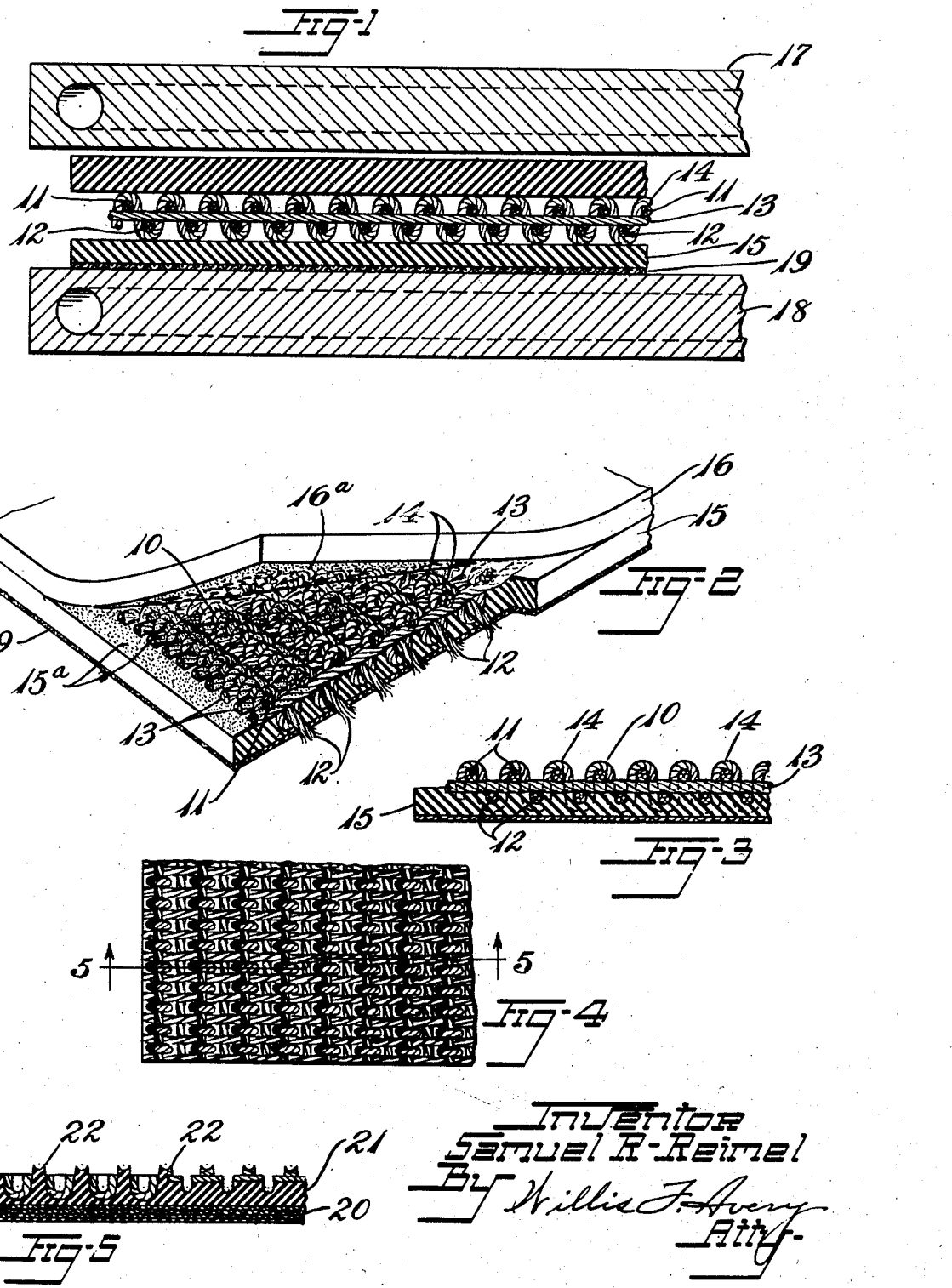

2,147,218

UNITED STATES PATENT OFFICE 2,147,218

MOLD FOR AND METHOD OF MOLDING RUBBER ARTICLES

Samuel R. Reimel, Akron, Ohio, assignor to The B. F. Goodrich Company, New York, N. Y., a corporation of New York Application November 11, 1936, Serial No. 110,244

8 Claims. (Cl. 18—47)

This invention relates to molds for forming rubber articles and to methods of molding, and especially to the molding of rubber surfaces to reproduce textile and other surface configurations.

The principal objects of the present invention are to provide procedure whereby objectionable distortion of the textile or other pattern material is avoided, to make possible the accurate reproduction of the surface configuration of deeply tufted textile materials, to provide a mold facing of textile material effectively cushioned, and to provide a mold having a facing of textile material non-adherent to rubber. These and other objects will appear from the following description and the accompanying drawing.

Of the drawing:

Fig. 1 is a cross-sectional view illustrating a step in the operation of forming the mold, showing a pair of heated press platens and interposed materials.

Fig. 2 is a perspective view showing a textile material partially embedded in rubber to form a mold and a temporary rubber backing partially removed therefrom.

Fig. 3 is a cross-sectional view of the mold in its preferred form.

Fig. 4 is a face view of a rubber article formed by pressure from the mold of Fig. 3.

Fig. 5 is a cross sectional view of the same taken on line 5—5 of Fig. 4.

Referring to the drawing, the mold of this invention is provided with a face 10 of textile material, preferably formed of material such as hemp, having a poor adhesive property as to rubber, and, in the preferred form of the invention, formed of stiff warp cords 11, 12, uncrimped filler cords 13, and crimped filler cords 14 alternating therewith. This textile material is partially embedded, as shown in Figs. 2 and 3, in a layer 15, of firm heat-resisting vulcanized rubber, preferably somewhat resilient.

For the purpose of embedding the textile material in the face of the rubber material without objectionable flattening or distortion of the fabric, the opposite face of the textile material preferably is dusted with soapstone, mica, or other suitable lubricating material, and a layer 16 of plastic unvulcanized soft rubber composition is applied to that face, the lubricating material being shown at 15a and 16a in Fig. 2. The assembled layers may then be placed between platens 17, 18, of a press and heat and pressure are applied. The soft layer 16 conforms itself to the textile layer and transmits pressure thereto without flattening or distorting the textile material. Heat and pressure are continued until both layers 15 and 16 of rubber are vulcanized. Thereafter layer 16 may be stripped from the face of the textile layer as shown in Fig. 2. The layer 16 having served its purpose is then discarded.

One or more plies of rubberized strength-giving fabric 19 may be vulcanized to the layer 15 in the same operation to reinforce the mold additionally.

The mold comprising the textile material face 10 and the rubber backing 15, with or without the further fabric reinforcement 19, may now be used to mold other rubber material, for instance, a conveyor belt, such as is illustrated in Figs. 4 and 5, having a strain-resisting textile body 20, and a rubber wear surface layer 21 may be vulcanized in contact with the mold just described by use of heat and pressure so as to form its face with a rough article-contacting surface having spired projections 22 which act to retain objects upon its surface. The spired projections are formed by flow of the rubber into the deeper crevices of the textile mold face.

The textile face of the mold is wear-resisting and non-adhesive and any adhesive character thereof preferably is counteracted by application of a lubricant, such as soapstone dust, powdered mica, or soap solution, to the mold face prior to molding the article.

By making the mold as herein described the fabric is securely held in its rubber base 15, and the original highly-crimped or deep-tufted surface configuration of the fabric is preserved without objectionable distortion. Further, in the step of molding the article against this mold face, the rubber base 15, which conforms throughout to the lower face of the fabric, supports and holds the same against objectionable distortion, and the resilience of the base serves also to resist objectionable flattening of the fabric. The result is a high degree of accuracy in the reproduction of the original surface configuration of the fabric in the surface of the final article.

I claim:

1. The method of making a mold for forming rubber articles which comprises conforming an unvulcanized rubber backing to a textile mold facing layer by pressure applied to the facing through a layer of flowable plastic material, vulcanizing the rubber backing, and removing the flowable plastic material from the face of the textile facing.

2. The method of making a mold for forming rubber articles which comprises conforming an unvulcanized rubber backing to a textile mold facing layer by pressure applied to the facing through a layer of vulcanizable plastic material, vulcanizing the rubber backing and the vulcanizable plastic material, and removing the vulcanized plastic from the face of the textile facing material.

3. The method of mounting a layer of textile material upon a plastic backing which comprises embedding the facing in the plastic backing by pressure applied to the facing through a layer of flowable plastic material, and removing the flowable plastic material from the face of the textile material.

4. The method of reproducing in the surface of a rubber article the surface configuration of a flexible sheet material which method comprises simultaneously molding layers of rubber against the two faces of the sheet material, removing the rubber from one face thereof to provide said face as a face of a mold with the rubber at the opposite face conforming to and supporting the sheet material, and molding a rubber article against the mold face thus provided.

5. The method of permanently mounting yieldable woven facing material upon a plastic backing which comprises partially embedding the yieldable facing material in the plastic backing by pressure applied to the facing material through a layer of flowable material so that the form of the yieldable material is substantially maintained, adhering the facing material to said plastic backing to maintain its relation to said backing, and removing the flowable material from the facing.

6. The method of making a mold which comprises conforming a backing of plastic material to a mold facing of yieldable woven material resistant to adhesion by pressure applied to the facing material through a layer of flowable material so that the form of the yieldable material is substantially maintained, and removing the flowable material from the facing to expose its molding face.

7. A mold comprising a resilient rubber cushion layer having permanently adhered to and embedded in its molding face a flexible layer of coarse deep-looped woven textile material providing a non-adhesive molding surface adapted to form a counterpart surface upon an article of manufacture, the resilient cushion layer permitting resilient yielding of the textile layer to facilitate loosening in stripping the article therefrom.

8. A mold comprising a resilient rubber cushion layer having permanently adhered to and embedded in its molding face a flexible layer of coarse deep-looped woven textile material providing a non-adhesive molding surface having regularly spaced deep pockets adapted to form a surface of regularly spaced protuberances upon an article of manufacture, the resilient cushion layer permitting resilient yielding of the textile layer to facilitate loosening in stripping the article therefrom.

SAMUEL R. REIMEL.